US010726577B2

(12) United States Patent
Gonzalez Aguirre et al.

(10) Patent No.: US 10,726,577 B2
(45) Date of Patent: Jul. 28, 2020

(54) POST-INCIDENT MANAGEMENT FOR AUTONOMOUS VEHICLES

(71) Applicant: Intel Corporation, Santa Clara, CA (US)

(72) Inventors: David Gonzalez Aguirre, Hillsboro, OR (US); Omar Florez, Sunnyvale, CA (US); Julio Zamora Esquivel, Zapopan (MX); Mahesh Subedar, Laveen, AZ (US); Javier Felip Leon, Hillsboro, OR (US); Rebecca Chierichetti, Brookings, OR (US); Andrea Johnson, Beaverton, OR (US); Glen Anderson, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 283 days.

(21) Appl. No.: 15/869,933

(22) Filed: Jan. 12, 2018

(65) Prior Publication Data
US 2019/0051015 A1 Feb. 14, 2019

(51) Int. Cl.
*G06T 7/00* (2017.01)
*G06T 7/32* (2017.01)
*G06T 7/80* (2017.01)
*G08G 1/00* (2006.01)
*G06T 7/33* (2017.01)

(52) U.S. Cl.
CPC .................. *G06T 7/80* (2017.01); *G06T 7/32* (2017.01); *G06T 7/33* (2017.01); *G06T 7/97* (2017.01); *G06T 2207/30252* (2013.01); *G08G 1/22* (2013.01)

(58) Field of Classification Search
CPC .... G06T 7/32; G06T 7/33; G06T 7/80; G06T 7/97; G06T 2207/30252; G08B 1/22
See application file for complete search history.

(56) References Cited

U.S. PATENT DOCUMENTS

| 2016/0086494 A1* | 3/2016 | Anandayuvaraj .... G08G 5/0039 701/3 |
| 2017/0123428 A1* | 5/2017 | Levinson ............. G05D 1/0231 |
| 2017/0185078 A1* | 6/2017 | Weast ..................... H04W 4/80 |

(Continued)

OTHER PUBLICATIONS

Ulehmann, E. ("Platooning—Connected Vehicles for Safety and Efficiency," Vehicular Technology Magazine, vol. 11, No. 3, Sep. 2016) (Year: 2016).*

*Primary Examiner* — Yubin Hung
(74) *Attorney, Agent, or Firm* — Jaffery Watson Mendonsa & Hamilton LLP

(57) ABSTRACT

In one example a management system for an autonomous vehicle, comprises a first image sensor to collect first image data in a first geographic region proximate the autonomous vehicle and a second image sensor to collect second image data in a second geographic region proximate the first geographic region and a controller communicatively coupled to the first image sensor and the second image sensor and comprising processing circuitry to collect the first image data from the first image sensor and second image data from the second image sensor, generate a first reliability index for the first image sensor and a second reliability index for the second image sensor, and determine a correlation between the first image data and the second image data. Other examples may be described.

15 Claims, 12 Drawing Sheets

(56) References Cited

U.S. PATENT DOCUMENTS

| | | | |
|---|---|---|---|
| 2018/0061148 A1* | 3/2018 | Dudar | B64C 39/024 |
| 2018/0321688 A1* | 11/2018 | Chase | G08G 1/012 |
| 2019/0068962 A1* | 2/2019 | Van Schoyck | G01C 21/20 |
| 2019/0113537 A1* | 4/2019 | Zhou | G05D 1/102 |
| 2019/0118827 A1* | 4/2019 | Khalifeh | B60W 50/0205 |
| 2019/0147331 A1* | 5/2019 | Arditi | G01C 21/32 |
| | | | 706/20 |
| 2019/0196481 A1* | 6/2019 | Tay | G05D 1/0214 |
| 2019/0204097 A1* | 7/2019 | Starns | G06Q 10/02 |

* cited by examiner

POST-INCIDENT MANAGEMENT FOR AUTONOMOUS VEHICLES

BACKGROUND

The subject matter described herein relates generally to the field of electronic devices and more particularly to a post incident management for autonomous vehicles.

New generations of autonomous vehicles utilize robust and calibrated sensor networks. These networks comprise redundant collections of complementary sensor modalities. Due to their complexity and sensibility, such sensor networks can be affected in case of an accident or other incident which causes even minimal or non-apparent damage to the scene perception of the sensor networks.

After an accident or other damaging incident, e.g., encountering a rock or other obstacle in the highway, the complexity and impact of any damage to the Advanced Driver Assistant System (ADAS) can be difficult to be detect, (i.e., in case of small impacts or subtle physical deformation(s) on radar antenna, the solid state or MEMS LIDAR's or cameras), because such minor damage may not create a malfunction or complete loss of connectivity between sensors and perception/action computers. These deformations of chassis or other types of significant changes in the sensor state (e.g., position, orientation, shape, sensibility, etc.) or other forms of damage in the mechanical coupling (such as robotic actuators) would render the autonomous vehicle disabled despite of the possibility to remain in a limited but reliable functional state within the so-called safety-completeness features.

Accordingly, systems and methods to implement post-incident management for autonomous vehicles may find utility, e.g., in managing autonomous vehicles.

BRIEF DESCRIPTION OF THE DRAWINGS

The detailed description is described with reference to the accompanying figures.

DETAILED DESCRIPTION

Figure 1:
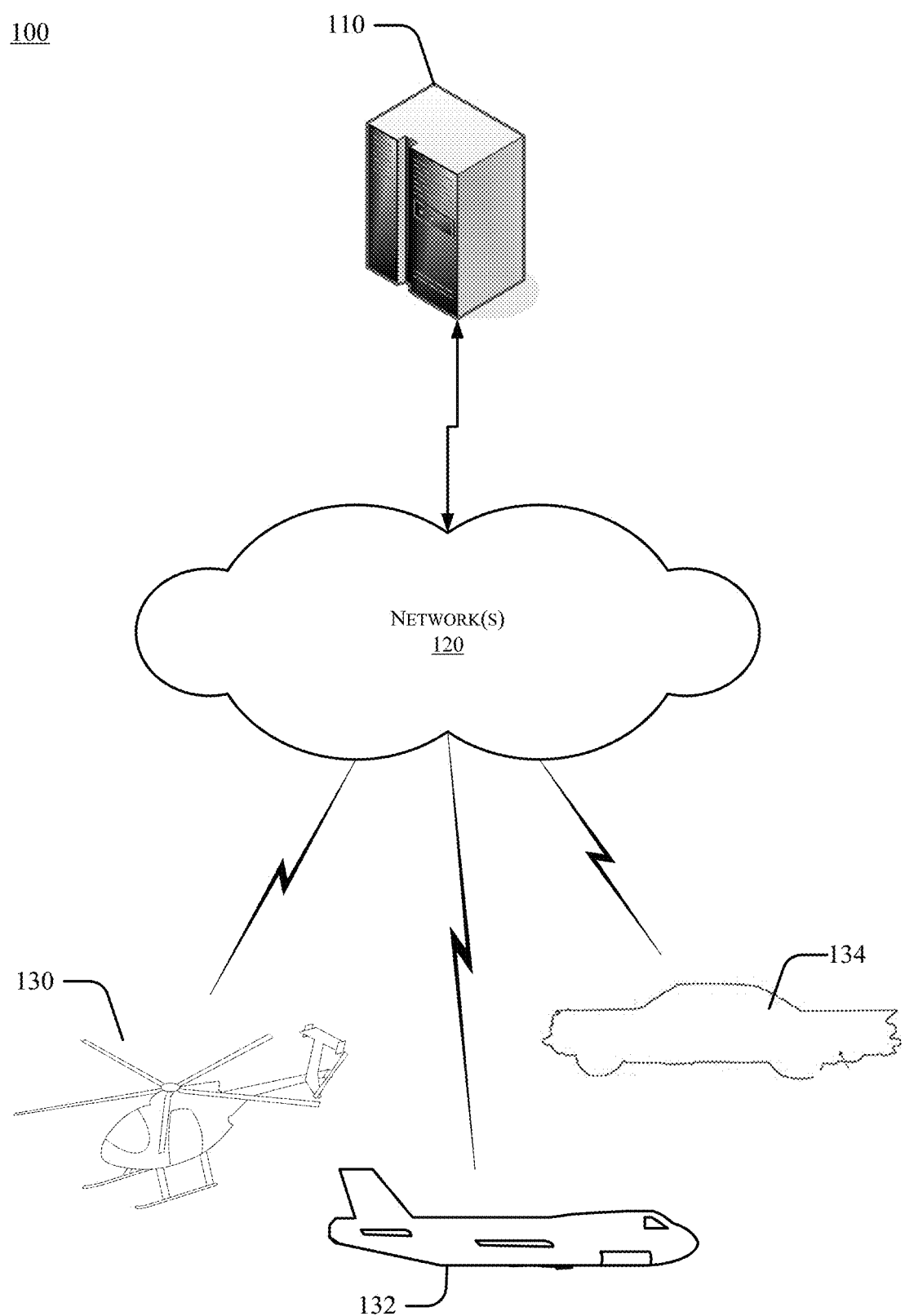
FIG. 1 is a schematic illustration of an environment for post-incident management for autonomous vehicles, in accordance with some examples.

Described herein are examples of a post-incident management for autonomous vehicles. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide post-incident management for autonomous vehicles. In a first aspect, a management system for an autonomous vehicle comprises a first image sensor to collect first image data in a first geographic region proximate the autonomous vehicle and a second image sensor to collect second image data in a second geographic region proximate the first geographic region and a controller communicatively coupled to the first image sensor and the second image sensor. In some examples the controller comprises processing circuitry to collect the first image data from the first image sensor and second image data from the second image sensor; generate a first reliability index for the first image sensor and a second reliability index for the second image sensor; and determine a correlation between the first image data and the second image data. The controller further comprises processing circuitry to generate a virtual sensor in response to a determination that at least one of the first image sensor or the second image sensor are in a failure state.

In another aspect, a management system for an autonomous vehicle comprises at least one sensor to monitor an environmental condition in a geographic region proximate the autonomous vehicle and a controller communicatively coupled to the at least one sensor and comprising processing circuitry to detect a failure condition in the at least one sensor and in response to the failure condition, to gather environmental data for a geographic region surrounding the at least one sensor and implement post-incident management operations for the autonomous vehicle.

In yet another aspect an electronic device comprises a processor and a computer readable memory communicatively coupled to the processor and comprising logic instructions which, when executed by the processor, configure the processor to receive sensor failure data from an autonomous vehicle, identify at least one additional vehicle available to form a platoon with the autonomous vehicle, determine a platoon formation comprising the at least one additional vehicle, a destination, a travel plan, and a sensor configuration for the platoon formation, and transmit the platoon formation, the destination, the travel plan, and the sensor configuration for the platoon formation to the at least one autonomous vehicle and the at least one additional vehicle.

As used herein, the term vehicle should be construed broadly to include cars, trucks, ships, aircrafts, spacecrafts, trains, buses or any form of transportation in which humans or animals may reside. Further structural and operational details will be described with reference to FIGS. 1-10, below.

FIG. 1 is a schematic illustration of an environment for post-incident management for autonomous vehicles, in accordance with some examples. Referring to FIG. 1, in some examples the environment 100 comprises one or more cloud-based vehicle management systems 110 communicatively coupled to a communication network 120 capable of transmitting information from the vehicle management system(s) 110 to one or more autonomous vehicles such as a helicopter 130, an aircraft 132 or an automotive vehicle 134.

In some examples vehicle management system(s) 110 may comprise one or more processor-based devices, e.g., server(s) comprising computer-readable memory which stores software updates for one or more devices communicatively coupled to the one or more autonomous vehicles. Network 120 may be embodied as a public communication network such as, e.g., the internet, or as a private communication network, such as a cellular network, or combinations thereof.

Figure 2:
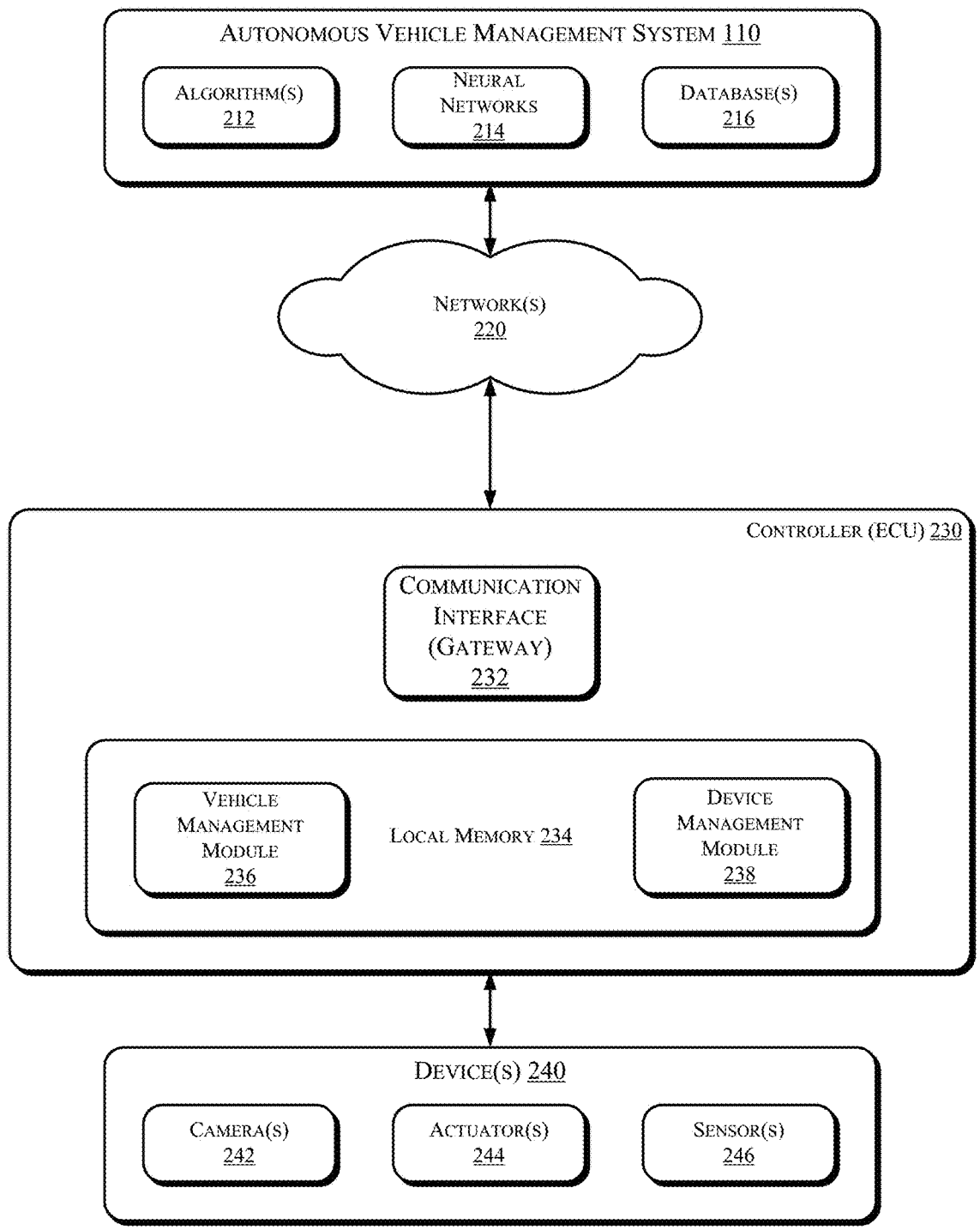
FIG. 2 is a high-level schematic illustration of an exemplary architecture to implement post-incident management for autonomous vehicles in accordance with some examples.

FIG. 2 is a high-level schematic illustration of an exemplary architecture to implement post-incident management for autonomous vehicles in accordance with some examples. Referring to FIG. 2, in some examples the autonomous vehicle management system 110 may comprise one or more vehicle management algorithms 212 which may comprise software and/or firmware to manage devices on one or more autonomous vehicles. Vehicle management system 110 may comprise one or more neural networks 214 to manage devices on one or more autonomous vehicles. Vehicle management system 110 may further comprise one or more databases to manage data associated with devices on one or more autonomous vehicles.

Autonomous vehicle management system 110 is communicatively coupled to one or more controllers 230, also referred to sometimes as an electronic control unit (ECU), via communication network(s) 220. Network(s) 220 may be embodied as a public communication network such as, e.g., the internet, or as a private communication network, such as a cellular network, or combinations thereof.

Controller 230 may be incorporated into or communicatively coupled to an autonomous vehicle. Controller 230 may be embodied as general purpose processor such as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. Alternatively, controller 230 may be embodied as a low-power controller such as a field programmable gate array (FPGA) or the like.

Controller 230 may comprise a communication interface 232 to manage communication via network 220, a local memory 234, a manageability service module 236, and a policy engine 238. Communication interface 232 may comprise, or be coupled to, an RF transceiver which may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

In some examples, local memory module 236 may comprise random access memory (RAM) and/or read-only memory (ROM). Memory 236 may be also be implemented using other memory types such as dynamic RAM (DRAM), synchronous DRAM (SDRAM), and the like. Memory 240 may comprise one or more applications including a vehicle management module 236 and a device management module 238 may be implemented as logic instructions executable on controller 230, e.g., as software or firmware, or may be reduced to hardwired logic circuits.

Controller 230 may be coupled to one or more devices 240 on an autonomous vehicle. For example, devices 240 may include one or more image acquisition device(s) (e.g., camera(s)) 242, actuator(s)s 244, or other sensor(s) 246.

Having described various structural components of examples of an architecture for autonomous vehicles, operations implemented by the system will be described. In a first aspect, described with reference to FIGS. 3A-3B, a system and method for post-incident management provides techniques to augment sensors with a virtual sensor which may be constructed by applying a neural network to sensor data. Such techniques may prove useful, e.g., in the event of an accident or other incident which causes a sensor to fail or otherwise become unreliable. The techniques will be described in the context of sensors that are image collection devices (e.g., cameras), but such techniques apply equally to other sensors, e.g., radar, lidar, sonar, etc.

Figure 3A:
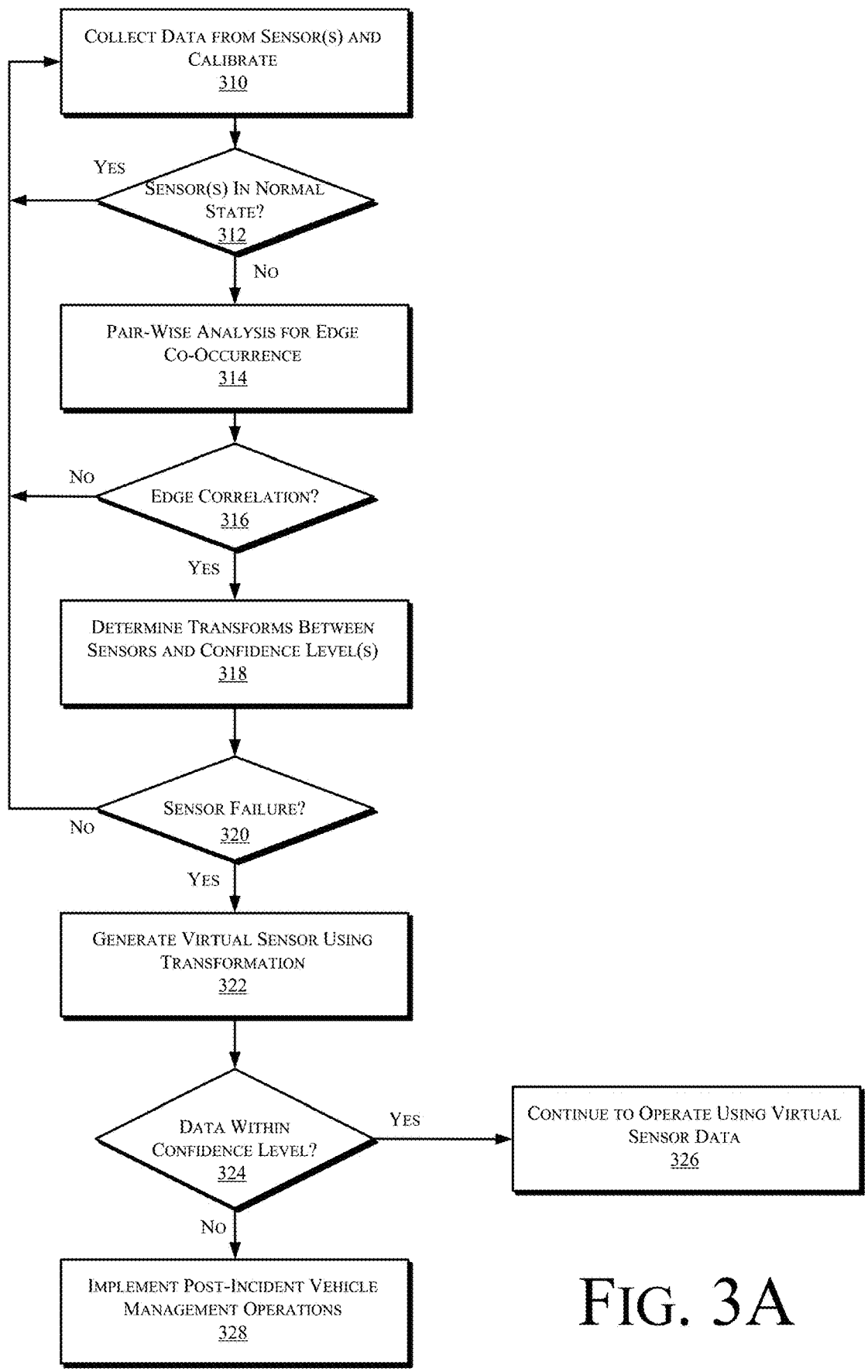
FIG. 3A is a flowchart illustrating operations in a method to implement post-incident management for autonomous vehicles in accordance with some examples.
Figure 3B:
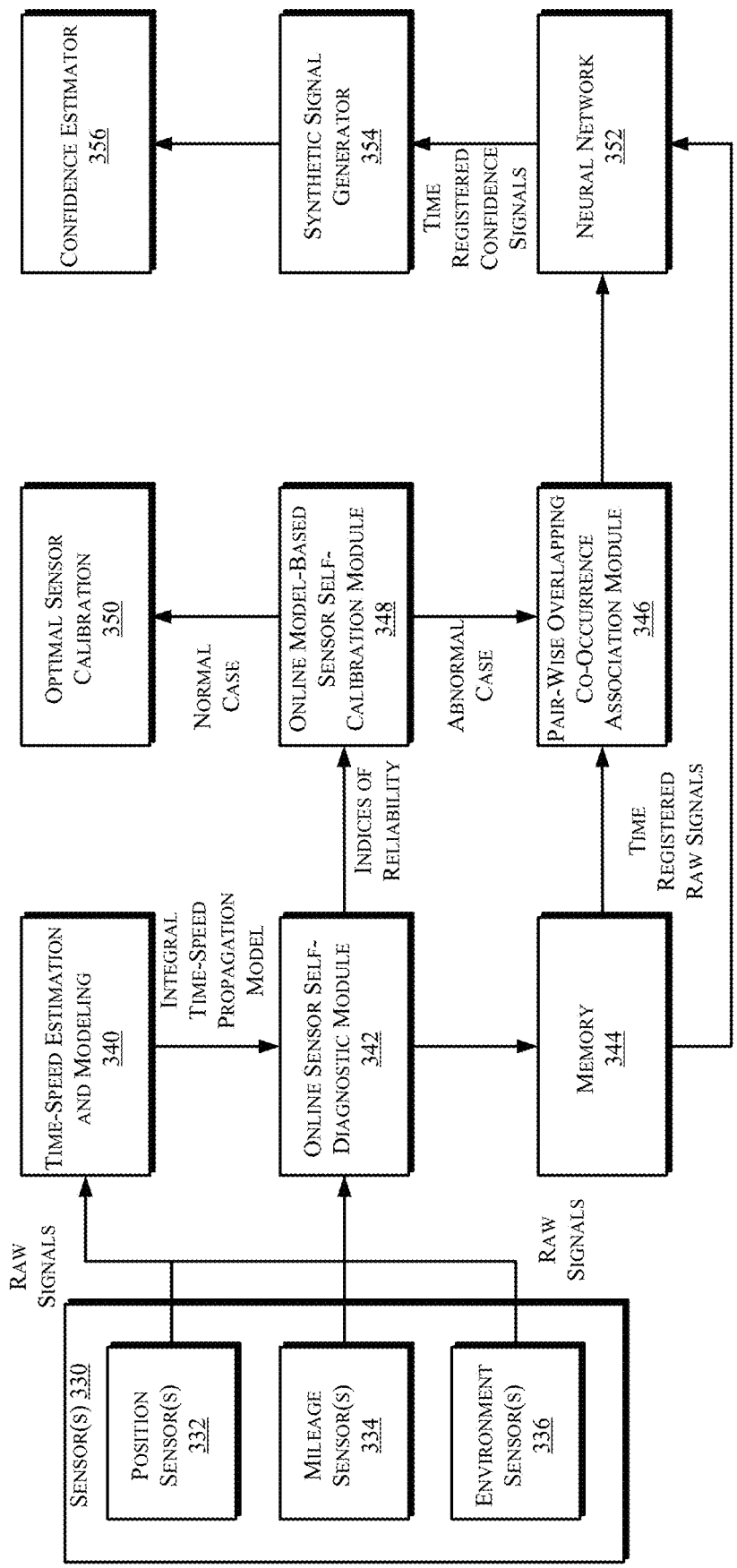
FIG. 3B is a diagram illustrating elements in an architecture to implement post-incident management for autonomous vehicles in accordance with some examples.

Referring to FIGS. 3A-3B, at operation 310 data is collected and the sensor(s) are calibrated. For example, raw signals from sensors 330 including one or more position sensors 332, mileage sensors 334, and environment sensors such as an image acquisition device (e.g., a camera), a radar, lidar, or the like. The raw signals from the sensors are input to a time-speed estimation and modeling module 340 which produces an integral time-speed propagation model. In addition, the raw signals from the sensors and the integral time-speed propagation model are input to an online sensor self-diagnostic module 342, which generates an index of reliability for each sensor. In some examples the online sensor self-diagnostic module 342 manages the sensor data in a series of circular buffers in memory 344.

The indices of reliability generated by the online sensor self-diagnostic module 342 are input to an online model-based sensor self-calibration module 348. Based on the input from self-diagnostic module, an extrinsic (i.e., 6D pose) and intrinsic (i.e., focal length, distortion, etc.) internal parameters a non-linear optimization is implemented to assert the current real state of the sensor(s). In some examples the method's plausibility relays on the narrow range for each of the involved parameters of the calibration. This means the optimization can be executed as a parallel search with multiple hypothesis evaluated and ranked in parallel, this is also known as compact hyper-volume of the parameter space. This produces ideal workloads for FPGAs and other computing platforms in the vehicle. In the event that the self-calibration completes successfully and all sensors appear to be in a normal state (operation 312) it results in an optimal online calibration 350 for the sensors and control passes back to operation 310. By contrast, if one or more of the sensors appears not to be in a normal state then control passes to operation 314 and a pair-wise analysis is performed between sensors on the vehicle to determine whether there is an edge co-occurrence in the data collected by the sensors. In one example the time registered raw signals from a first sensor and a second sensor are isochronously input to a pair wise co-occurrence association module 346, tracks the latest sensor readings which have a high index of reliability, and computes the consistency of pair-wise (edge of co-occurrence) associatively based on geometric overlapping, to address this a precise timing (isochronous triggering signals) need to be present in the sensors. For that goal the use of featureless labeled segmentation also known as semantic segmentation or signal classification (i.e., Recurrent Deep Neural Networks) may be used to determine similarity or deviating sensor pairs. Sensors only connected by an unreliable edged may be considered out of order. On the contrary, those connected (along various frames) by at least one stable co-occurrence, namely a stable edge will be considered for a dual synthetic sensor signal generation in module 4

If, at operation 316, no stable edge correlation exists between the data evaluated in operation 314 then control passes back to operation 310 and the process continues to gather data. By contrast, if at operation 316 a stable edge correlation exists between the data evaluated in operation 314 then control passes to operation 318 and a set of transforms between the sensor data is determined. Also, a confidence level is computed and associated with the co-occurrence by transforming the sensor signal "X" from one sensor "A" to another sensor signal "Y" from a sensor "B" in terms of their kinematic orientation (6D pose) T_A and T_B and intrinsic parameters I_A and I_B of each sensor, then the expected signal Y'=T_A^-1(X) is compared with the actual signal received in the sensor "B" as |W(Y)−W(Y')|, in this process the W transform takes into account the partial overlapping due to relative placement of the sensors. Thus, the confidence level is the adaptive (depending on the geographic region and a time window) normalized difference between these sensors and their relative co-occurrence of signals.

If, at operation 320 there is no sensor failure then control passes back to operation 310 and the process continues to gather data. By contrast, if at operation 320 a sensor failure condition exists then control passes to operation 322 a synthetic signal generator 354 generates virtual sensor data using the output from a paired sensor and the transform(s) determined in operation 318. By way of example, in the event that a first sensor is paired with a second sensor and the second sensor fails, a virtual second sensor may be generated by applying the transform between the first sensor data and the second sensor data to the first sensor data.

If, at operation 324 the data generated in operation 322 is within a predetermined confidence level then the virtual sensor may be deemed sufficiently accurate to allow the vehicle to continue operations using the virtual sensor (operation 326). By contrast, if at operation 326 the data generated in operation 322 is not within a predetermined confidence level then the virtual sensor may be deemed insufficiently accurate to allow the vehicle to continue operations using the virtual sensor and post-incident vehicle management operations may be implemented. Various post-incident vehicle management operations are described below.

In another aspect, described with reference to FIGS. 4A, 4B, 4C, and FIG. 5, systems and methods for post-incident vehicle management operations are implemented. In some examples the systems and methods for post-incident vehicle management operations may be implemented in conjunction with the vehicle management techniques described with reference to FIGS. 3A-3B. In other examples the post-incident vehicle management operations may be implemented independently.

In one example, a management system to implement post-incident vehicle management operations for an autonomous vehicle, comprises at least one sensor to monitor an environmental condition in a geographic region proximate the autonomous vehicle and a controller communicatively coupled to the at least one sensor and comprising processing circuitry to detect a failure condition in the at least one sensor and in response to the failure condition, to gather environmental data for a geographic region surrounding the at least one sensor and implement post-incident management operations for the autonomous vehicle. The post-incident management operations may comprise forming a platoon with at least one other vehicle.

In another example, an electronic device, comprises a processor and a computer readable memory communicatively coupled to the processor and comprising logic instructions which, when executed by the processor, configure the processor to receive sensor failure data from an autonomous vehicle, identify at least one additional vehicle available to form a platoon with the autonomous vehicle, determine a platoon formation comprising the at least one additional vehicle, a destination, a travel plan, and a sensor configuration for the platoon formation, and transmit the platoon formation, the destination, the travel plan, and the sensor configuration for the platoon formation to the at least one autonomous vehicle and the at least one additional vehicle.

Figure 4A:
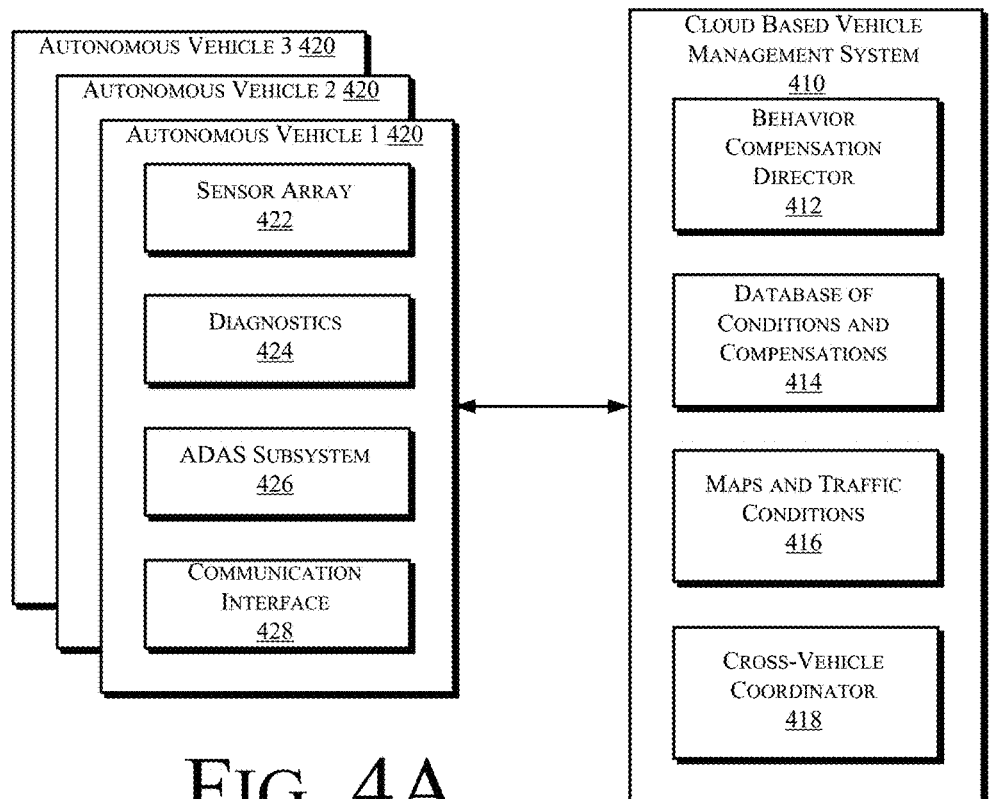
FIG. 4A is a diagram illustrating elements in an architecture to implement post-incident management for autonomous vehicles in accordance with some examples.
Figure 5:
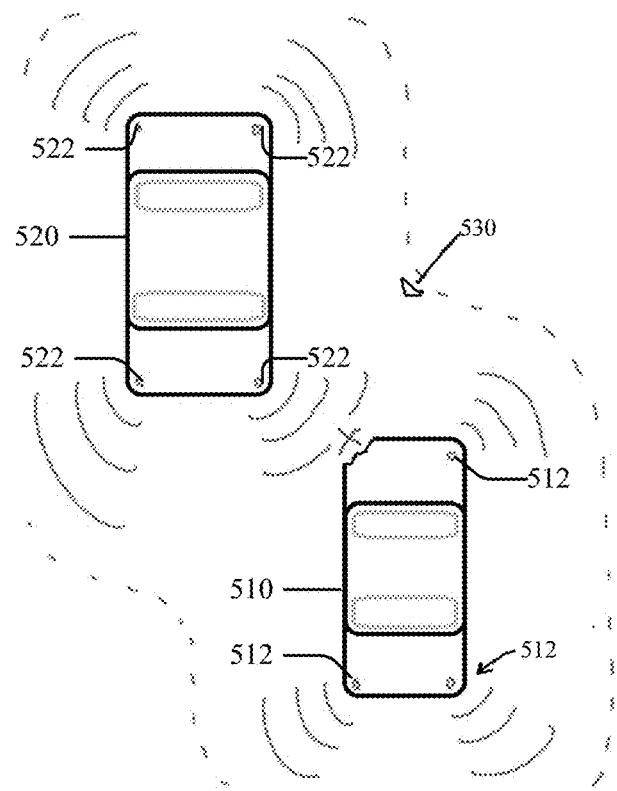
FIG. 5 is a schematic illustration of a platoon in a method to implement post-incident management for autonomous vehicles in accordance with some examples.

FIG. 4A is a diagram illustrating elements in an architecture to implement post-incident management for autonomous vehicles in accordance with some examples. Referring to In some examples a cloud based vehicle management system 410 may comprise a behavior compensation director 412, a database of conditions and compensations 414, a database of maps and traffic conditions 416, and a cross-vehicle coordinator module 418.

The cloud based vehicle management system may be communicatively coupled to one or more autonomous vehicles 420. Each autonomous vehicle 420 may comprise one or more sensor arrays 422, a diagnostics module 424, an advanced driver assistant subsystem (ADAS) 426, and a communication interface 428. In some examples, as described above, the sensor array 422 may comprise image capture devices, radar, lidar, position sensors, mileage sensors, and the like. Diagnostics module 424 may comprise algorithms to diagnose errors in the sensor arrays 422. ADAS subsystem 426 may comprise algorithms to facilitate autonomous vehicle management, including post-incident vehicle management.

Communication interface 428 may comprise, or be coupled to, an RF transceiver which may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Figure 4B:
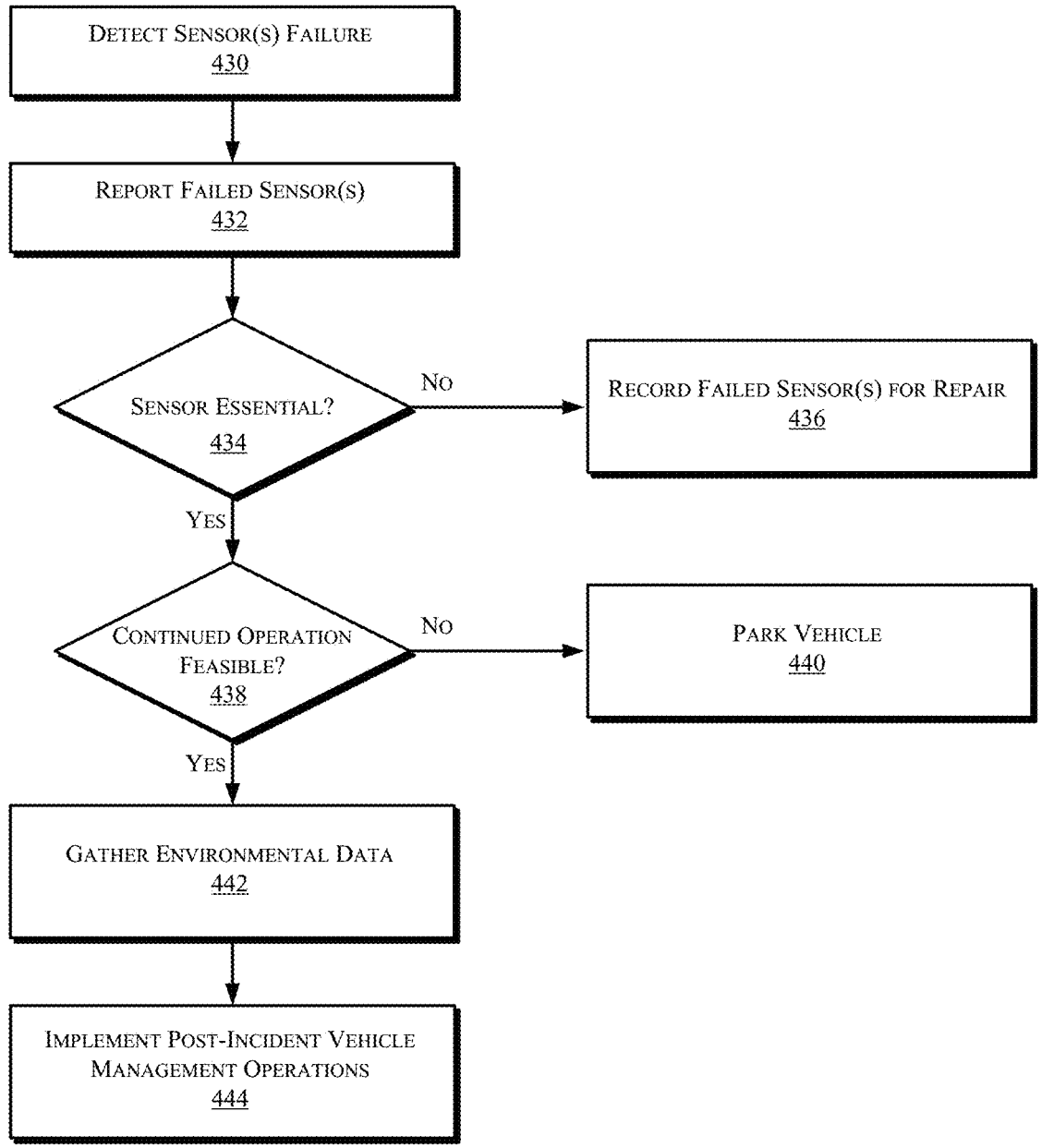
FIGS. 4B-4C are flowcharts illustrating operations in a method to implement post-incident management for autonomous vehicles in accordance with some examples.

Various operations for post-incident vehicle management implemented within the architecture depicted in FIG. 4A are described with reference to FIGS. 4B-4C. Referring to FIG. 4B, at operation 430 a failure in the sensor(s) is detected. In some examples the diagnostics module 424 may monitor the sensor arrays to detect one or more failure conditions with the sensor array(s) 422. At operation 432 the sensor failure(s) are reported. In some examples the diagnostics module 424 may report failure(s) in the sensor array(s) to the ADAS subsystem 426 and/or to the cloud based vehicle management system 410 via the communication interface 428.

At operation 434 it is determined whether the sensor array(s) that reported a failure are essential to continued operations of the vehicle. In some examples the diagnostics module 426 and/or the ADAS subsystem 428 may implement a rules-based algorithm to determine whether a particular sensor array(s) is essential to continued operations of the vehicle. One example of a set of rules is given in Table I.

TABLE I

Example of Rules

| Sensor | Status | Requirement | Action |
| --- | --- | --- | --- |
| Forward LiDAR 1 | Defective | At least 3 forward LiDAR must function for normal drive, 2 must function for speed <30 mph. <2 requires front replacement (second car acceptable). | Call for compatible vehicle to form platoon (front attach) |
| Forward LiDAR 2 | Defective | At least 3 forward LiDAR must function for normal drive, 2 must function for speed <30 mph. <2 requires front replacement (second car acceptable). | Call for compatible vehicle to form platoon (front attach) |
| Forward LiDAR 3 | Normal | At least 3 forward LiDAR must function for normal drive, 2 must function for speed <30 mph. <2 requires front replacement (second car acceptable). | Call for compatible vehicle to form platoon (front attach) |

If, at operation 434, the failed sensor(s) is not considered essential to the continued operations of the autonomous vehicle 420 then control passes to operation 436 and the failure of the sensor(s) is recorded for repair, but the vehicle otherwise continues normal operations.

By contrast, if at operation 434 the failed sensor(s) is deemed essential to continued operations, then control passes to operation 438 and it is determined whether continued operation of the vehicle is feasible even though an essential sensor(s) has failed. If, at operation 438, the controller determines that continued operation of the vehicle is not feasible then control passes to operation 440 and instructions are executed to park the vehicle. For example, the ADAS subsystem 426 may execute instructions to park the vehicle. By contrast, if at operation 438, it is determined that continued operation of the vehicle is feasible then control passes to operation 442 and the ADAS subsystem 426 gathers environmental data for the geographic region surrounding the vehicle from the various sensor arrays 422 on the vehicle that are in an operational condition. At operation 444 post-incident vehicle management operations are implemented. In some examples the operations may be implemented by the ADAS subsystem 426, alone or in combination with the cloud based vehicle management system.

Figure 4C:
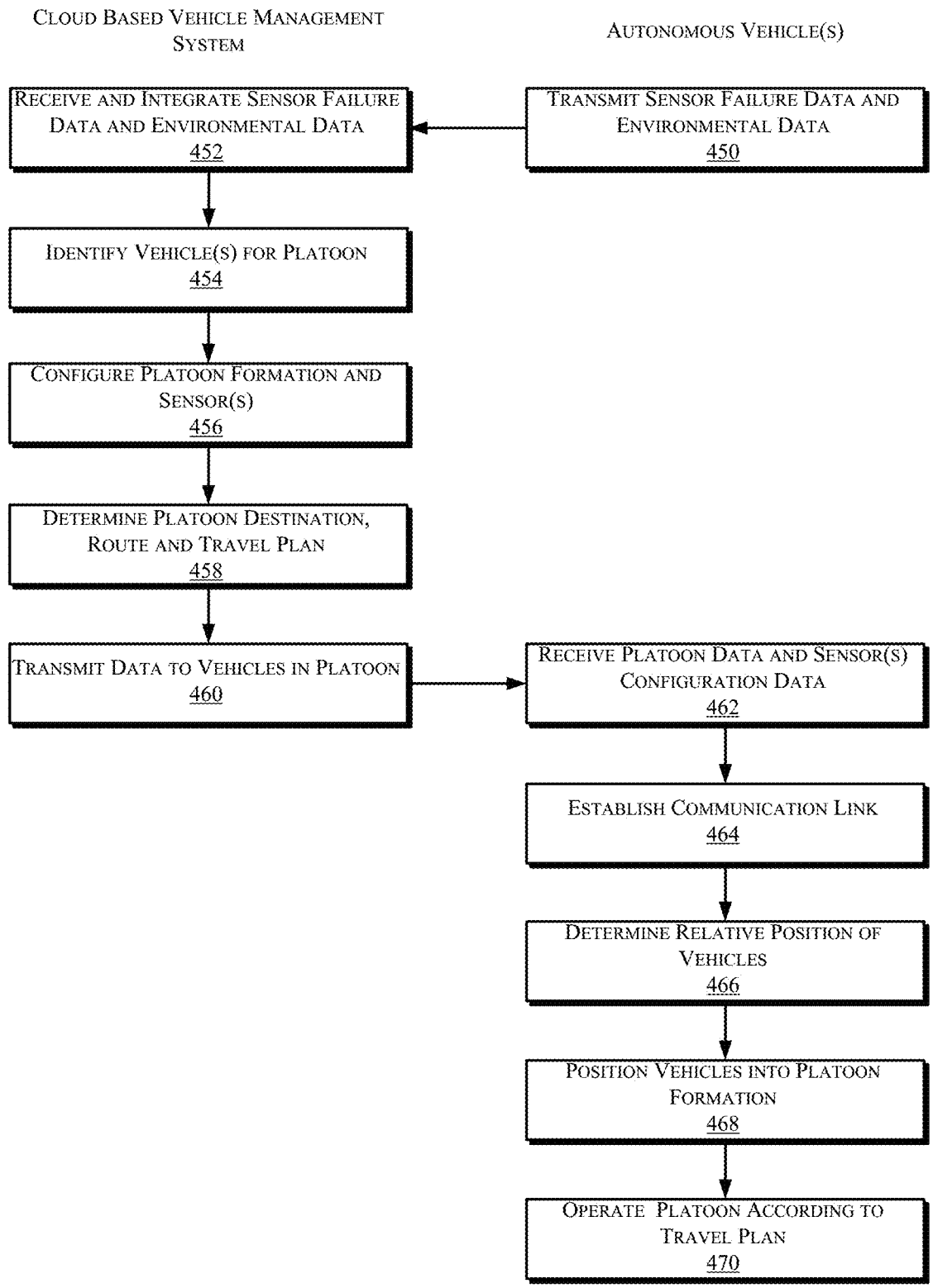

FIG. 4C is a flowchart illustrating operations in one example of posti-incident vehicle management. method to implement the update protocols referenced in operation 330. Referring to FIG. 4C, at operation 450 sensor failure data and the environmental data gathered in operation 442 is transmitted to the cloud based vehicle management system 410.

At operation 452 the cloud based vehicle management system 410 receives and integrates the sensor failure data and the environmental data. For example, the sensor failure data and the environmental data may be integrated into the database of conditions and compensations 414.

At operation 454 the cloud based management system 410 identifies one or more vehicles that are available to form a platoon with the autonomous vehicle that has experienced a sensor failure. In some examples the one or more vehicles may be other autonomous vehicles that are in close proximity to the autonomous vehicle that has experienced a sensor failure. In other examples specialized vehicle may be dispatched to the autonomous vehicle that has experienced a sensor failure. For example, one or more drones may be dispatched to fly to the autonomous vehicle that has experienced a sensor failure.

At operation 456 the cloud based management system 410 configures a platoon formation and sensors for the platoon. In the example depicted in FIG. 5 a first autonomous vehicle 510 comprises a number of sensors 512 one of which has been damaged. In this instance the cloud based management system 410 may identify a second vehicle 520 comprising sensors 522 and configure a platoon 530 comprising the first vehicle 510 and the second vehicle 520 positioned such that the rear sensors 522 of the second vehicle can be positioned to cover the geographic region which is supposed to be covered by the failed sensor in the first vehicle 510.

At operation 458 the cloud based management system 410 determines the destination for the platoon 530, which may include a route and travel plans. For example, the cloud based management system may plot a route and travel plans using the database of maps and traffic conditions 416. At operation 460 the cloud based vehicle management system 410 transmits the platoon formation, destination, and travel plan data to the autonomous vehicle(s) that will form the platoon.

At operation 462 the autonomous vehicle(s) in the platoon receive the platoon formation, destination, and travel plan data. At operation 464 the autonomous vehicle(s) in the platoon establish a communication link between the vehicles. At operation 466 the autonomous vehicle(s) in the platoon determine the relative position of the vehicles and at operation 468 the autonomous vehicle(s) position themselves into the platoon formation indicated by the cloud based management system 410. At operation 470 the autonomous vehicle(s) in the platoon operate in a unified fashion to travel to the platoon destination following the route and travel plan determined by the cloud based vehicle management system 410.

Figure 6:
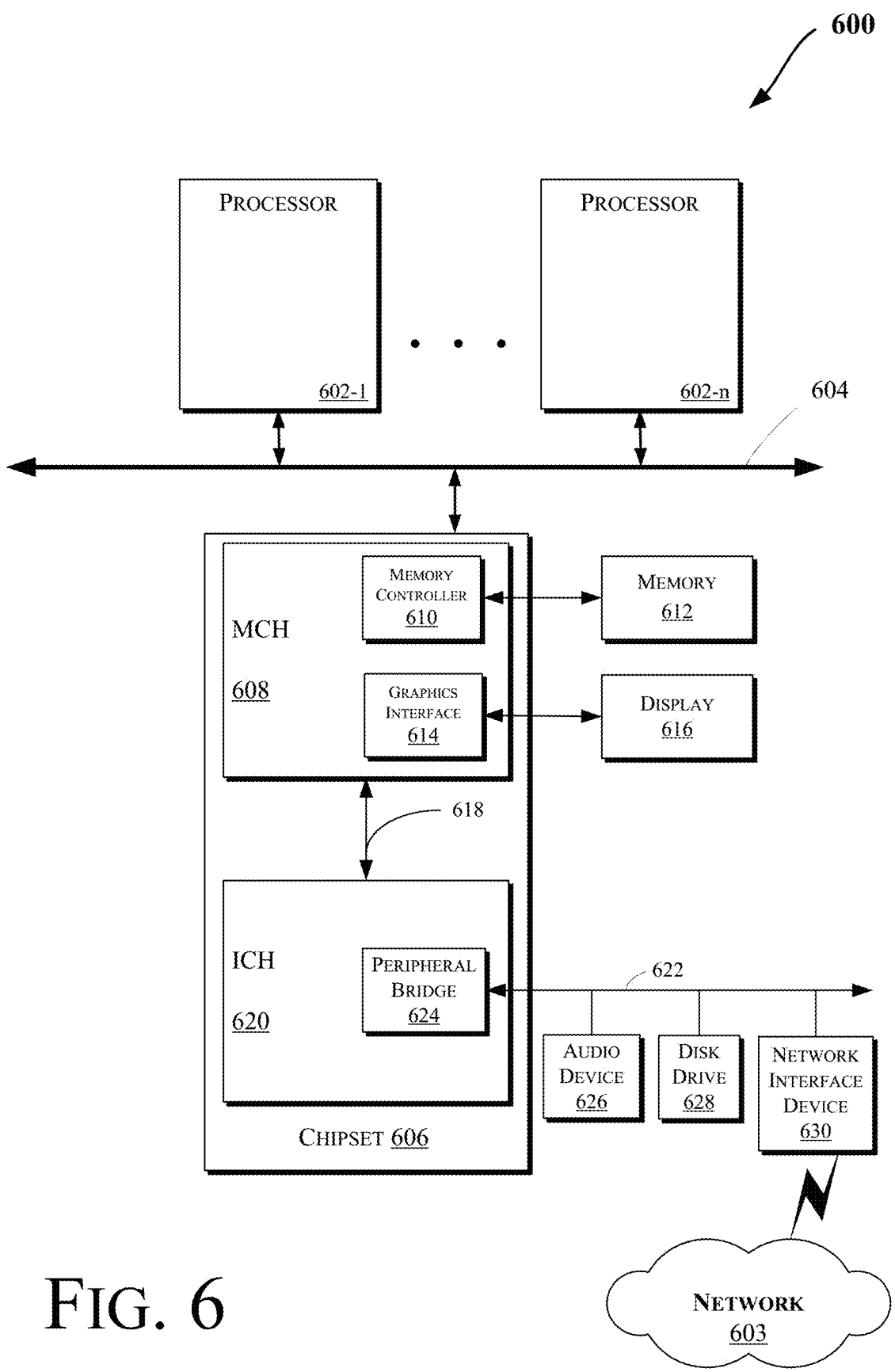
FIGS. 6-10 are schematic illustrations of electronic devices which may be adapted for use in a context aware software update framework for autonomous vehicles in accordance with some examples.

Thus, described herein are examples of post-incident management autonomous vehicles. As described above, in some examples the controller 230 and may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors.

A chipset 606 may also communicate with the interconnection network 604. The chipset 606 may include a memory control hub (MCH) 608. The MCH 608 may include a memory controller 610 that communicates with a memory 612. The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
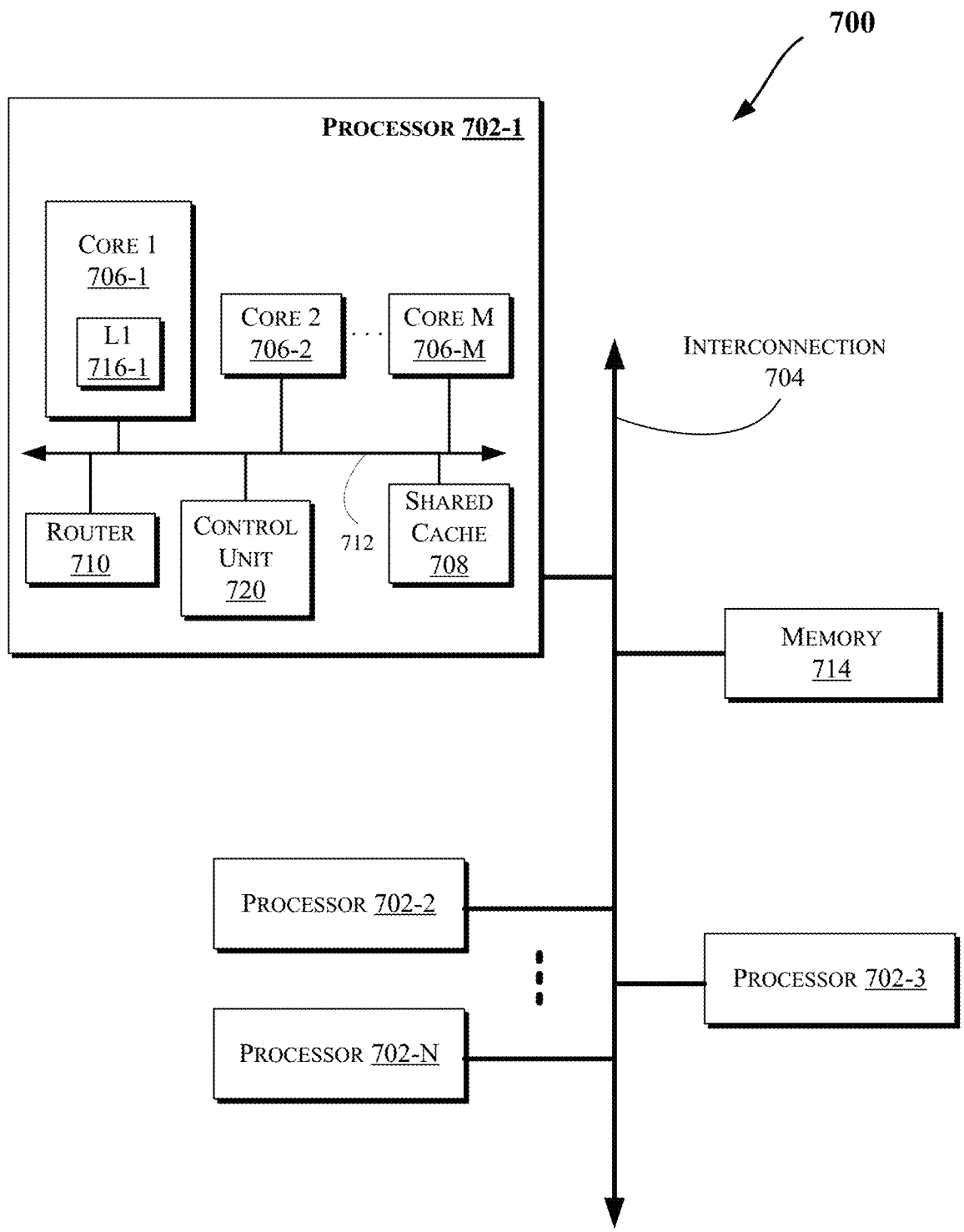

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716").

Figure 8:
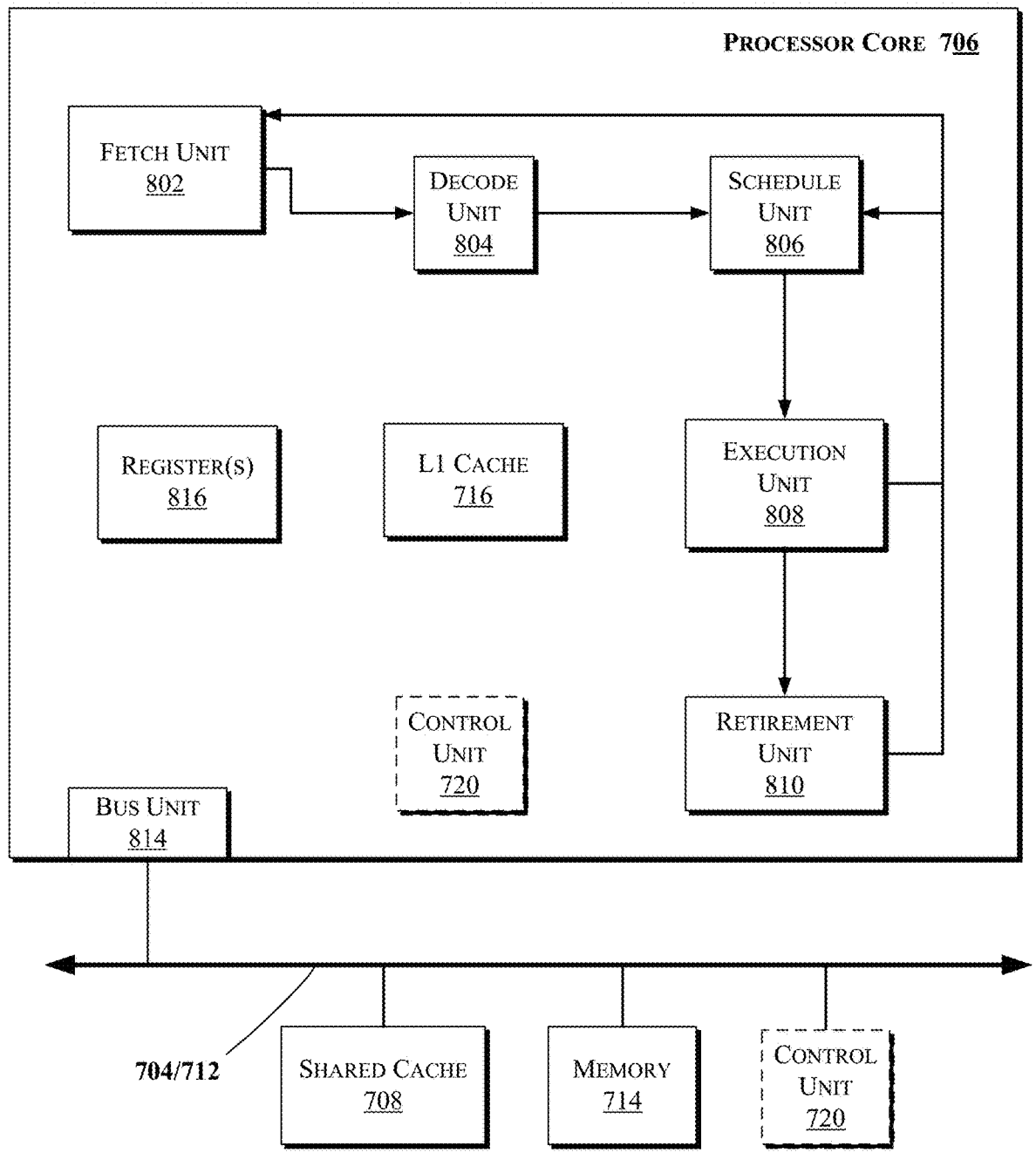

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
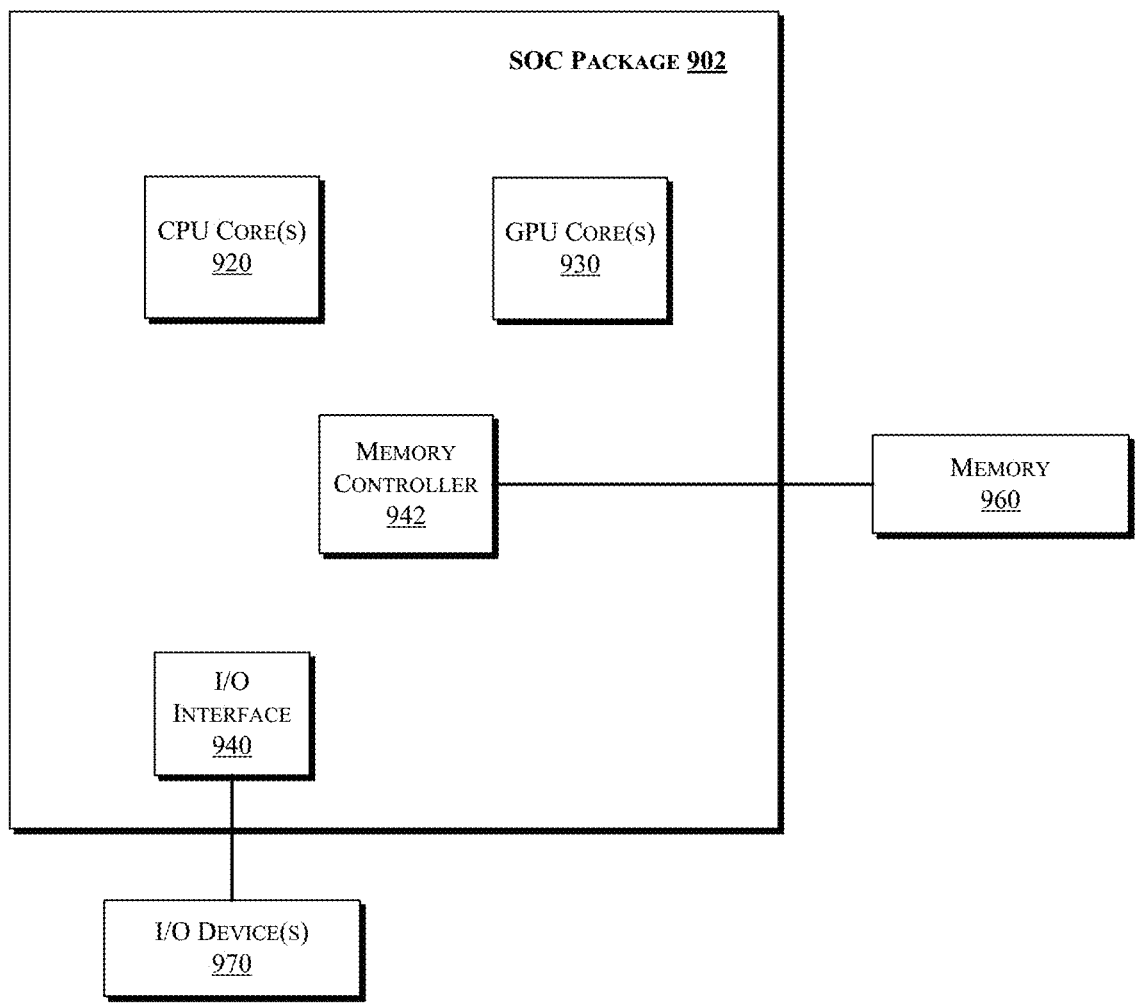

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device (s) 970 may include one or more of a keyboard, a mouse, a touchpad, a display, an image/video capture device (such as a camera or camcorder/video recorder), a touch surface, a speaker, or the like.

Figure 10:
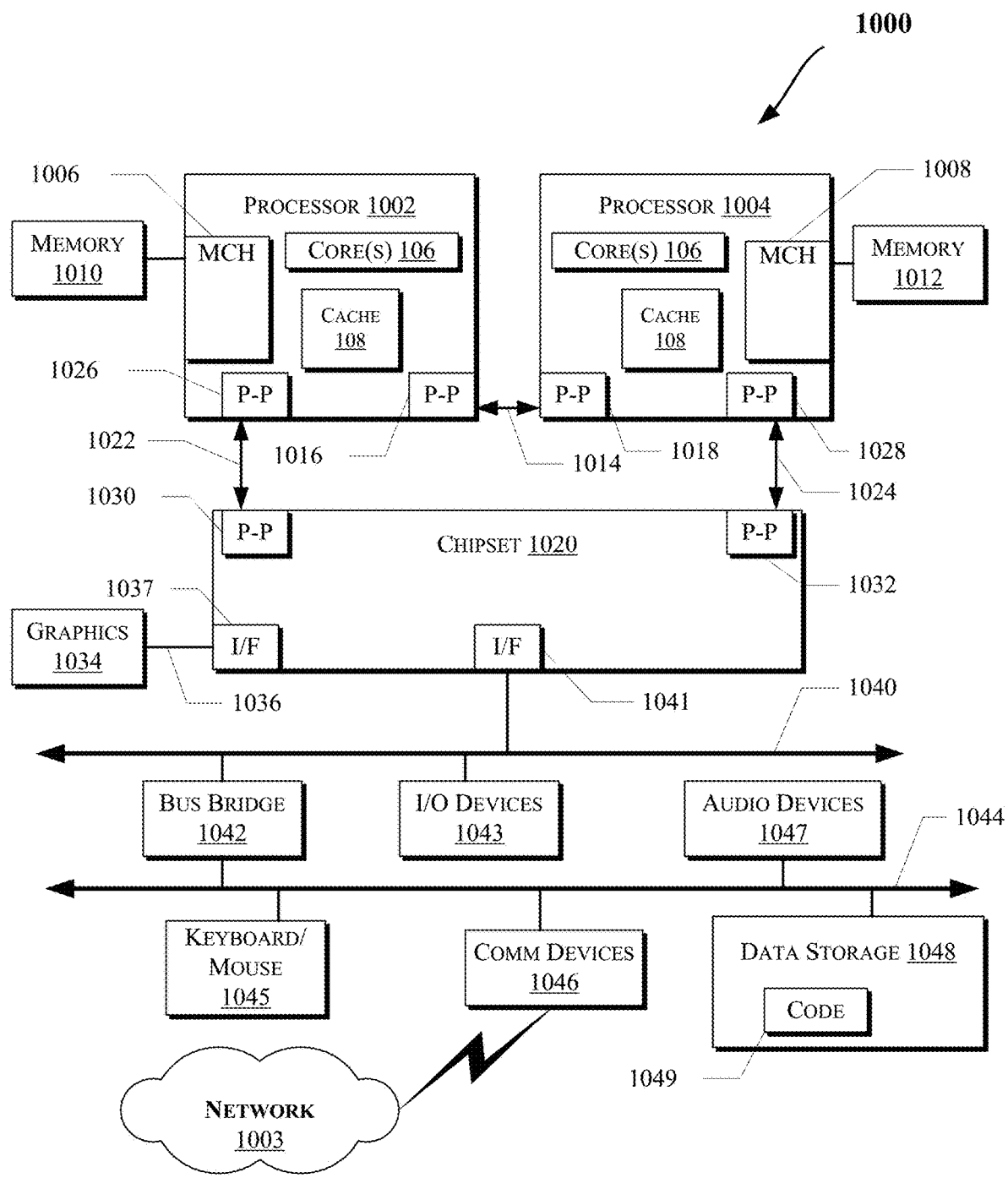

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following pertains to further examples.

Example 1 is management system for an autonomous vehicle, comprising a first image sensor to collect first image data in a first geographic region proximate the autonomous vehicle and a second image sensor to collect second image data in a second geographic region proximate the first geographic region and a controller communicatively coupled to the first image sensor and the second image sensor and comprising processing circuitry to collect the first image data from the first image sensor and second image data from the second image sensor, generate a first reliability index for the first image sensor and a second reliability index for the second image sensor and determine a correlation between the first image data and the second image data.

In Example 2, the subject matter of Example 1 can optionally include an arrangement in which the controller comprises processing circuitry to apply an integral time-speed propagation model to the first image data to generate the first reliability index; and apply an integral time-speed propagation model to the second image data to generate the second reliability index.

In Example 3, the subject matter of any one of Examples 1-2 can optionally include an arrangement in which the controller comprises processing circuitry to perform self-calibration procedure for the first image sensor and the second image sensor to determine whether at least one of the first image sensor or the second image sensor are in an abnormal state.

In Example 4, the subject matter of any one of Examples 1-3 can optionally include an arrangement in which the controller comprises processing circuitry to perform a pairwise analysis for edge co-occurrence between the first image data and the second image data in response to a determination that the at least one of the first image sensor or the second image sensor are in an abnormal state.

In Example 5, the subject matter of any one of Examples 1-4 can optionally include an arrangement in which the controller comprises processing circuitry to determine whether there exists at least one stable co-occurrence of a stable edge between the first image data and the second image data.

In Example 6, the subject matter of any one of Examples 1-5 can optionally include an arrangement in which the controller comprises processing circuitry to determine a transform between the first image data and the second image data in response to a determination that there exists at least one stable co-occurrence of a stable edge between the first image data and the second image data; and determine a confidence value associated with the transform between the first image data and the second image data.

In Example 7, the subject matter of any one of Examples 1-6 can optionally include an arrangement in which the controller comprises processing circuitry to determine whether at least one of the first image sensor or the second image sensor are in a failure state.

In Example 8, the subject matter of any one of Examples 1-7 can optionally include an arrangement wherein the controller comprises processing circuitry to generate a virtual sensor in response to a determination that at least one of the first image sensor or the second image sensor are in a failure state.

In Example 9, the subject matter of any one of Examples 1-8 can optionally include an arrangement wherein the controller comprises processing circuitry to continue to operate the vehicle using the virtual sensor when the confidence value associated with the transform between the first image data and the second image data meets or exceeds a threshold.

In Example 10, the subject matter of any one of Examples 1-9 can optionally include an arrangement in which the controller comprises processing circuitry to continue to operate the vehicle using the virtual sensor when the confidence value associated with the transform between the first image data and the second image data meets or exceeds a threshold.

In Example 11, the subject matter of any one of Examples 1-10 can optionally include an arrangement wherein the controller comprises processing circuitry to implement a post-incident vehicle management protocol in response when the confidence value associated with the transform between the first image data and the second image data fails to meet the threshold.

In Example 12, the subject matter of any one of Examples 1-11 can optionally include an arrangement wherein the post-incident vehicle management protocol comprises at least one of parking the vehicle in a safe location or forming a platoon with one or more additional vehicles.

Example 13 is a management system for an autonomous vehicle, comprising at least one sensor to monitor an environmental condition in a geographic region proximate the autonomous vehicle; and a controller communicatively coupled to the at least one sensor and comprising processing circuitry to detect a failure condition in the at least one sensor; and in response to the failure condition, to: gather environmental data for a geographic region surrounding the at least one sensor; and implement post-incident management operations for the autonomous vehicle.

In Example 14, the subject matter of Example 13 can optionally include processing circuitry to determine whether the at least one sensor is essential for continued operations of the autonomous vehicle.

In Example 15, the subject matter of any one of Examples 13-14 can optionally include processing circuitry to receive, from a remote source, a platoon formation comprising at least one additional vehicle, a destination, a travel plan, and a sensor configuration for the platoon formation.

In Example 16, the subject matter of any one of Examples 13-15 can optionally include processing circuitry to establish a communication link with the at least one additional vehicle; and determine a position of the at least one additional vehicle.

In Example 17, the subject matter of any one of Examples 13-16 can optionally include processing circuitry to position the autonomous vehicle and the at least one other vehicle into the platoon formation; and operate the platoon according to the travel plan.

In Example 18, the subject matter of any one of Examples 13-17 can optionally include processing circuitry to exchange sensor data with the at least one additional vehicle.

Example 19 is electronic device, comprising a processor; and a computer readable memory communicatively coupled to the processor and comprising logic instructions which, when executed by the processor, configure the processor to receive sensor failure data from an autonomous vehicle; identify at least one additional vehicle available to form a platoon with the autonomous vehicle; determine a platoon formation comprising the at least one additional vehicle, a destination, a travel plan, and a sensor configuration for the platoon formation; and transmit the platoon formation, the destination, the travel plan, and the sensor configuration for the platoon formation to the at least one autonomous vehicle and the at least one additional vehicle.

In Example 20, the subject matter of Example 20 can optionally include instructions which, when executed by a controller, configure the controller to monitor the platoon during operations according to the travel plan.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A management system for an autonomous vehicle, comprising:
    a first image sensor to collect first image data in a first geographic region proximate the autonomous vehicle and a second image sensor to collect second image data in a second geographic region proximate the first geographic region; and
    a controller communicatively coupled to the first image sensor and the second image sensor and comprising processing circuitry to:
        collect the first image data from the first image sensor and second image data from the second image sensor;
        generate a first reliability index for the first image sensor and a second reliability index for the second image sensor; and
        determine a correlation between the first image data and the second image data;
        perform self-calibration procedure for the first image sensor and the second image sensor to determine whether at least one of the first image sensor or the second image sensor are in an abnormal state; and
        perform a pair-wise analysis for edge co-occurrence between the first image data and the second image data in response to a determination that the at least one of the first image sensor or the second image sensor are in an abnormal state.

2. The management system of claim 1, wherein the controller comprises processing circuitry to:
    determine whether there exists at least one stable edge co-occurrence between the first image data and the second image data.

3. The management system of claim 2, wherein the controller comprises processing circuitry to:
    determine a transform between the first image data and the second image data in response to a determination that there exists at least one stable co-occurrence of a stable edge between the first image data and the second image data; and
    determine a confidence value associated with the transform between the first image data and the second image data.

4. The management system of claim 3, wherein the controller comprises processing circuitry to:
    determine whether at least one of the first image sensor or the second image sensor are in a failure state.

5. The management system of claim 4, wherein the controller comprises processing circuitry to:
    generate a virtual sensor in response to a determination that at least one of the first image sensor or the second image sensor are in a failure state.

6. The management system of claim 5, wherein the controller comprises processing circuitry to:
    continue to operate the vehicle using the virtual sensor when the confidence value associated with the transform between the first image data and the second image data meets or exceeds a threshold.

7. The management system of claim 5, wherein the controller comprises processing circuitry to:
    implement a post-incident vehicle management protocol in response when the confidence value associated with the transform between the first image data and the second image data fails to meet the threshold.

8. The management system of claim 7, wherein the post-incident vehicle management protocol comprises at least one of parking the vehicle in a safe location or forming a platoon with one or more additional vehicles.

9. A management system for an autonomous vehicle, comprising:
    at least one sensor to monitor an environmental condition in a geographic region proximate the autonomous vehicle; and
    a controller communicatively coupled to the at least one sensor and comprising processing circuitry to:
        detect a failure condition in the at least one sensor; and
        in response to the failure condition, to:
            gather environmental data for a geographic region surrounding the at least one sensor; and
            implement post-incident management operations for the autonomous vehicle; and
        receive, from a remote source, information about a platoon formation comprising at least one additional vehicle, a destination, a travel plan, and a sensor configuration for the platoon formation.

10. The management system of claim 9, further comprising processing circuitry to:
determine whether the at least one sensor is essential for continued operations of the autonomous vehicle.

11. The management system of claim 9, further comprising processing circuitry to:
establish a communication link with the at least one additional vehicle;
determine a position of the at least one additional vehicle.

12. The management system of claim 11, further comprising processing circuitry to:
augment the platoon formation with the autonomous vehicle; and
operate the augmented platoon according to the travel plan.

13. The management system of claim 11, further comprising processing circuitry to:
exchange sensor data with the at least one additional vehicle.

14. An electronic device, comprising:
a processor; and
a non-transitory computer readable memory communicatively coupled to the processor and comprising logic instructions which, when executed by the processor, configure the processor to:
receive sensor failure data from an autonomous vehicle;
identify at least one additional vehicle available to form a platoon with the autonomous vehicle;
determine information about a platoon formation comprising the at least one additional vehicle, a destination, a travel plan, and a sensor configuration for the platoon formation; and
transmit the information about the platoon formation to the at least one autonomous vehicle and the at least one additional vehicle.

15. The electronic device of claim 14, wherein the computer readable memory further comprises logic instructions which, when executed by the processor, configure the processor to:
monitor the platoon during operations according to the travel plan.

* * * * *